United States Patent
Myren

(10) Patent No.: US 10,482,433 B1
(45) Date of Patent: Nov. 19, 2019

(54) REAL-TIME TRANSACTION AND RECEIPT PROCESSING SYSTEMS

(71) Applicant: Capital One Services, LLC, McLean, VA (US)

(72) Inventor: Jeffrey Paul Myren, McLean, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 16/394,294

(22) Filed: Apr. 25, 2019

(51) Int. Cl.
*G06Q 20/00* (2012.01)
*G06Q 20/04* (2012.01)
*G06Q 20/20* (2012.01)
*G06Q 20/40* (2012.01)

(52) U.S. Cl.
CPC ....... *G06Q 20/0453* (2013.01); *G06Q 20/202* (2013.01); *G06Q 20/407* (2013.01)

(58) Field of Classification Search
CPC . G06Q 20/0453; G06Q 20/202; G06Q 20/407
USPC ...................................................... 705/16, 21
See application file for complete search history.

(56) References Cited

U.S. PATENT DOCUMENTS

| | | | |
|---|---|---|---|
| 7,487,912 B2 | 2/2009 | Seifert et al. | |
| 8,650,124 B2 | 2/2014 | Singh | |
| 8,880,431 B2 | 11/2014 | Ovick et al. | |
| 9,123,033 B2 | 9/2015 | Phillips et al. | |
| 2003/0126020 A1* | 7/2003 | Smith | G06Q 20/02 705/21 |
| 2004/0220964 A1 | 11/2004 | Shiftan et al. | |
| 2004/0225567 A1 | 11/2004 | Mitchell et al. | |
| 2004/0235450 A1 | 11/2004 | Rosenberg | |
| 2007/0272740 A1 | 11/2007 | Palacios | |
| 2009/0271267 A1 | 10/2009 | Moukas et al. | |
| 2011/0145082 A1* | 6/2011 | Hammad | G06Q 20/042 705/24 |
| 2013/0268378 A1* | 10/2013 | Yovin | G06Q 20/204 705/18 |

* cited by examiner

*Primary Examiner* — Rokib Masud
(74) *Attorney, Agent, or Firm* — Troutman Sanders LLP; Christopher J. Forstner; John A. Morrissett

(57) ABSTRACT

A transaction processing system for performing one or more steps of a method is disclosed. The system may receive user receipt preferences including rules specifying whether or not a user wants a receipt. The system may also receive (i) a purchase authorization request associated with an attempted purchase and (ii) user device location data. The system may further set a receipt flag corresponding to the receipt status. If the system determines that the transaction is to be authorized, it attaches the receipt flag to the authorization message and transmits the authorization message to the merchant. Alternatively, if the system determines that the transaction is not to be authorized, it attaches the receipt flag to the cancellation message and transmits the cancellation message to the merchant.

20 Claims, 5 Drawing Sheets

REAL-TIME TRANSACTION AND RECEIPT PROCESSING SYSTEMS

FIELD

The disclosed technology generally relates to transaction and receipt processing systems and, more particularly, systems and methods for real-time transaction processing, receipt processing, and receipt generation based on user defined rules.

BACKGROUND

Historically, receipt generation at a point-of-sale transaction has involved generating a paper transaction receipt and maintaining copies of the paper transaction receipt by both the consumer and the merchant. With the emergence of new payment and transaction technology, e-receipts have begun replacing paper transaction receipts for some transactions, however, by and large paper transactions receipts are still widely used today. However, existing processes of paper-based transaction receipts have many drawbacks, including the arduous and error-prone nature of reviewing and tracking paper receipts, the environment impacts of generating paper receipts, and the risk of misplacing or losing paper receipts. Accordingly, many users may prefer to avoid receiving paper receipts or limiting the situations and types of transactions in which they would receive a paper receipt. However, in the related art, a user's ability to specify transaction receipt preferences is limited.

Therefore, there is a need for improved systems and methods to provide receipt policy checking in real-time at the time of sale. Certain aspects of the present disclosure attempt to address these and other issues.

BRIEF SUMMARY

Certain disclosed embodiments provide systems and methods for transaction authorization and time of sale receipt policy implementation.

Consistent with the disclosed embodiments, various methods and systems are disclosed. In an embodiment, a system performing a method for providing transaction authorization and time of sale receipt policy implementation. Before a user attempts to conduct a transaction, the system may receive (e.g., from a user device, which may be a mobile device associated with the user) user receipt preferences including rules that specify whether the user wants a receipt or does not want a receipt for future transactions or certain types of transactions. When the user attempts to conduct the transaction, the system may receive (e.g., from a merchant device providing the goods or services for purchase) a purchase authorization request including a transaction amount, a financial account number associated with an account of the user, and a merchant category code (MCC). The system may also receive location data from the user device. In turn, the system may determine a receipt status based on user receipt preferences, the purchase authorization request, and the user device location data. Responsive to determining that the receipt status indicates that the user wishes to receive a receipt, the system may set a receipt flag to indicate that the merchant device should provide the user with a receipt. Alternatively, responsive to determining that the receipt status indicates that the user does not wish to receive a receipt, the system may set a receipt flag to indicate that the merchant device should not provide a receipt to the user. Further, the system may determine whether or not the attempted transaction should be authorized and attach the receipt flag to either the authorization message (e.g., when the transaction is authorized) or cancellation message (e.g., when the transaction is not authorized).

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

According to some embodiments, there is provided systems and methods for implementing a user defined receipt policy in real-time. For example, in some cases, a system identifies an incoming pending transaction, determines a receipt policy associated with a financial number of the pending transaction, and compares the transaction data against the user defined receipt policy. Based on this comparison, the system may set a receipt status flag to be transmitted to a merchant (e.g., via a merchant point-of-sale terminal) associated with the pending transaction. Based on the receipt status flag, the merchant (e.g., via a merchant point-of-sale terminal) may be able to determine whether to provide or print a receipt or to initiate a communication session with a mobile application associated with the system and running on a user device in order to determine the receipt preferences associated with the pending transaction.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
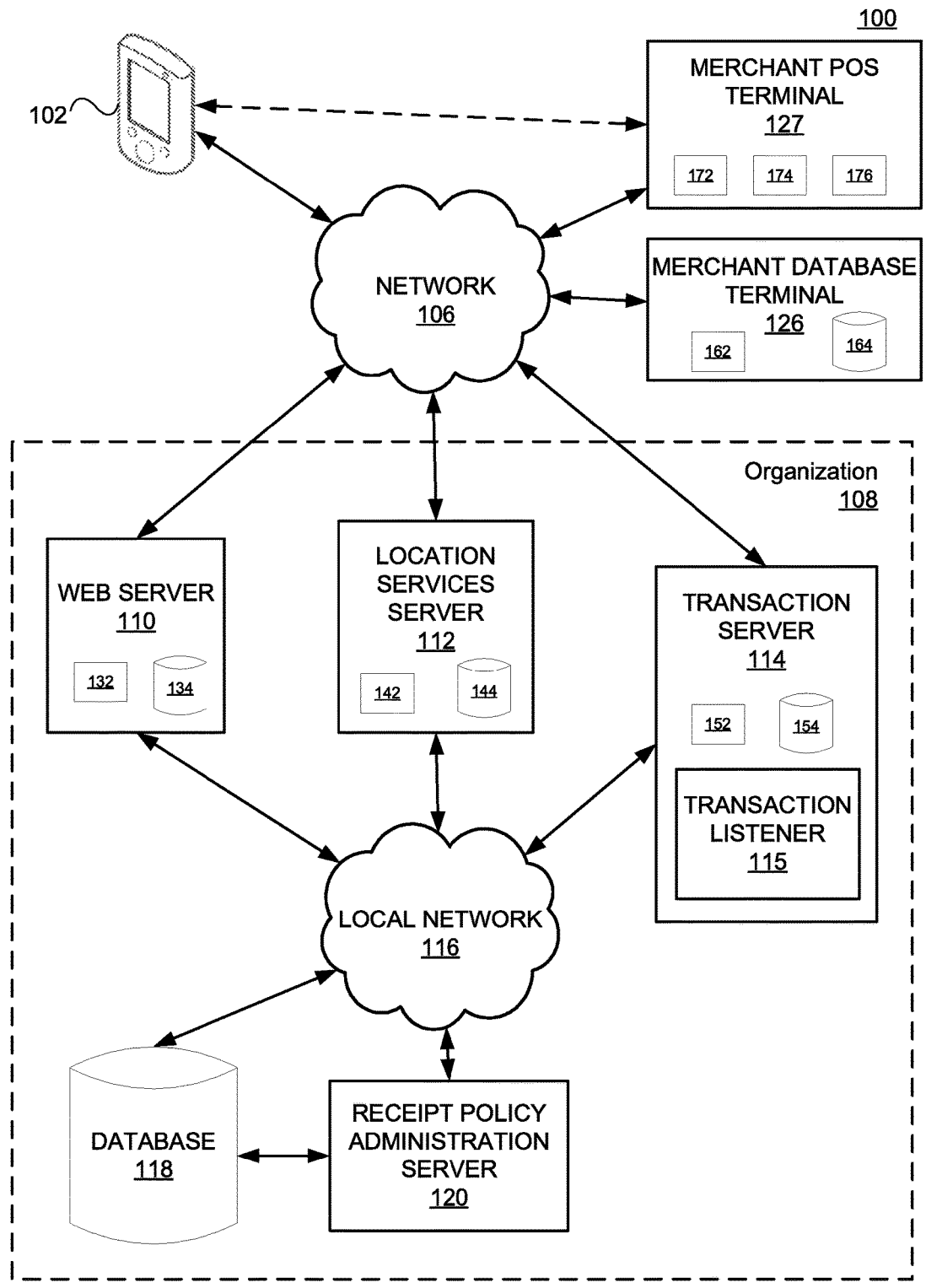
FIG. 1 is a diagram of an example system environment that may be used to implement one or more embodiments of the present disclosure.

FIG. 1 is a diagram of an exemplary system environment 100 that may be configured to perform one or more processes that provide real-time implementation of a user defined receipt policy. The components and arrangements shown in FIG. 1 are not intended to limit the disclosed embodiments as the components used to implement the disclosed processes and features may vary. As shown, system environment 100 may include one or more user device(s) 102, a merchant database terminal 126, a merchant POS terminal 127, and an organization 108 configured to communicate over a network 106. As shown, organization 108 may include, for example, a web server 110, a location services server 112, a transaction server 114, a database 118, and a receipt policy administration server 120 configured to communicate over a local network 116. An example architecture that may be used to implement one or more of the user device 102, merchant database terminal 126, merchant POS terminal 127, web server 110, location services server 112, transaction server 114, database 118, and receipt policy administration server 120 is described below with reference to FIG. 2.

User device 102 can include one or more of a mobile device, smart phone, smart watch, smart glasses, other smart wearable device, general purpose computer, tablet computer, laptop computer, telephone, PSTN landline, voice command device, other mobile computing device, or any other device capable of communicating with network 106 and ultimately communicating with one or more components of organization 108. According to some embodiments, user device 102 may communicate with a merchant database terminal 126, and/or merchant POS terminal 127 via network 106. According to some example embodiments, user device 102 may communicate with merchant database terminal 126, and/or merchant POS terminal 127 via a direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. In some embodiments, user device 102 may include or incorporate electronic communication devices for hearing or vision impaired users. In some embodiments, one or more user devices 102 may include software that is configured to allow a user to verify a purchase and/or authenticate a user of user device 102.

Network 106 may be of any suitable type, including individual connections via the internet such as cellular or Wi-Fi networks. In some embodiments, network 106 may connect terminals, services, and mobile devices using wired or wireless communication which include direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may be associated with an entity such as a business, corporation, individual, partnership, or any other entity that provides one or more of goods, services, and consultations to individuals such as customers. For example, in some embodiments, organization 108 may be associated with a financial services provider.

Organization 108 may include one or more servers, devices, and computer systems for performing one or more functions associated with products and/or services that organization 108 provides. Such servers, devices, and computer systems may include, for example, web server 110, location services server 112, transaction server 114, database 118, and receipt policy administration server 120 as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices of system 100. According to some embodiments, web server 110 may host websites, data or software applications that user device 102 may access and interact with. For example, web server 110 may provide a website, web portal or software application that allows a user of user device 102 to access or view account information associated with one or more financial accounts of the user. In some embodiments, web server 110 may receive and forward communications or portions of communications between user device 102 and components of system 100, such as location services server 112, transaction server 114, database 118, and/or receipt policy administration server 120. According to some embodiments, web server 110 may be configured to transmit data and/or messages from a first user device 102.

Location services server 112 may include a computer system configured to track the location of user device 102 based on information and data received from user device 102. For example, location services server 112 may receive location data from user device 102, such as global positioning satellite (GPS) data comprising the coordinates of the device, RFID data of associated with known objects and/or locations, or network data such as the identification, location, and/or signal strength of a wireless base station (e.g., Wi-Fi router, cell tower, etc.) connected to user device 102 that may be used to determine the location of user device 102. According to some embodiments, location services server 112 may store geofencing information that represents a designed location or area. As those of skill in the art will appreciate, a geofence may be a virtual geographic boundary that when crossed by user device 102, may trigger system 100 to execute one or more actions. According to some embodiments, the contours of a geofence may be predetermined, for example, location services server 112 may receive one or more predetermined geofences that are associated with respective locations from a third party. For example, location services server 112 may receive data representative of a geofence around a particular store from an organization associated with the store that determined the location of the geofence. In some embodiments, the contours of a geofence may be determined by receiving (e.g., from a user of system 100) the location of a point (e.g., longitude and latitude) and a radius and setting the contours of the geofence to be equal to the location of a circle draw around the point at the specified radius. In some embodiments, a geofence may be specified by a user of system 100 by, for example, drawing the geofencing onto a virtual map or otherwise inputting the location of the geofence. For example, the location of a geofence to be the perimeter of a particular merchant location. As will be appreciated, in such an embodiment, a system may be able to determine a that a user is shopping in a particular merchant location when the user's device crosses the perimeter of the particular merchant location.

Location services server 112 may have one or more processors 142 and one or more location services databases 144, which may be any suitable repository of location data. Information stored in location services server 112 may be accessed (e.g., retrieved, updated, and added to) via local network 116 and/or network 106 by one or more devices of system 100. In some embodiments, location services server processor 142 may be used to determine the location of user device 102, whether user device 102 has crossed a particular geofence or whether user device 102 is inside or outside of an area designated by a particular geofence. In some embodiments, location services server 112 may be configured to send messages and/or data to other devices, such as for example, user device 102 or receipt policy administration server 120, upon determining that user device 102 has crossed a specified geofence or entered an area encompassed by a specified geofence. For example, in some embodiments, location services server 112 may determine that user device 102 is within a geographic region of a pending purchase to authenticate a user of the user device 102.

Transaction server 114 may include a computer system configured to process one or more transactions involving a financial account associated with a customer. For example, a transaction may be a purchase of goods or services from a merchant that is made in association with a financial account, such as a bank account or a credit card account. Transactions may be made at merchant POS terminal 127 by for example, swiping a credit card or making a payment using financial account information stored on a smartphone in a digital wallet. Such transactions may be made at merchant locations or at a merchant website via the internet. Transactions may be made at merchant POS terminal 127 in many ways such as but not limited to a credit, debit or gift card swipe, use a contactless method such as credit, debit or other payment cards which offer this feature, key fobs, smart cards, or other devices, including smartphones and other mobile devices communicating or making a payments using financial account information and/or credentials that are known in the art. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices of system 100. As described in more detail below, transaction server 114 may store specified account numbers or PANs that may be the subject of transaction monitoring, as well as associated rules, limitations or restrictions regarding transaction receipts that may be applied to an attempted transaction associated with the specified account number/PAN to determine whether or not to generate a receipt with the associated transaction and may determine the method of delivery of a generated receipt.

As will be appreciated of those of skill in the art, a credit card may conventionally include a financial account number such as, for example, a primary account number (PAN). As will be appreciated, a primary account number (PAN) may be a numerical code that is typically between 14 and 16 digits long. In some embodiments, the first six digits of the PAN represent a credit card network, the next set of digits represent a user account number and one or more final digits may represent an additional fraud security digit. According to some embodiments, transaction server 114 may include a transaction listener 115 that may be configured to monitor transaction authorization data that originates from, for example, one or more merchant POS terminals or devices. According to some embodiments, transaction listener 115 may monitor incoming transaction authorization requests to identify attempted transactions that are associated with a stored PAN. For example, for each attempted transaction, transaction listener 115 may compare the PAN associated with the attempted transaction with a specified PAN to identify all attempted transactions associated with the specified PAN. For example, transaction listener 115 may identify one or more attempted transactions associated with a particular credit card account by monitoring transaction authorization request data to identify attempted transactions that were made in association with payment method associated with a PAN that matches the PAN of the specified credit card. According to some embodiments, transaction listener 115 may receive transaction authorization requests in real time if, for example, a financial account associated with the attempted payment method is part of a network associated with organization 108.

According to some embodiments, upon swiping a credit card at merchant POS terminal/device or entering the PAN into a website to make an online purchase, transaction server 114 may receive transaction authorization data representative of the attempted transaction. Such transaction authorization data may include the PAN associated with the card used to make the attempted purchase, and may include other information related to the transaction or merchant, such as the amount of the attempted transaction, the date and time of the attempted transaction, and a merchant category code (which may be referred to herein as a "merchant code") associated with the merchant at which the transaction was attempted. According to some embodiments, transaction server 114 may receive transaction authorization requests comprising transaction authorization data and may decide as to whether or not the transaction should be authorized. According to some embodiments, if transaction server 114 determines that the attempted transaction is subject to a receipt policy (e.g., if transaction listener 115 determines that a transaction card is subject to a receipt policy), transaction server 114 may forward the purchase information to receipt policy administration server 120. Receipt policy administration server 120 may then compare the purchase information to the receipt policy associated with transaction card in order to determine a receipt status associated with the purchase. Receipt policy administration server 120 may then transmit the receipt status to the transaction server 114 which may in turn generate an authorization message including the receipt status and transmit the authorization message to the merchant (e.g., to a merchant POS terminal or merchant database terminal).

In some embodiments, in response to authorizing a transaction, transaction server 114 may store a record of the transaction and update account information such as the balance of the account. Although the preceding description was made with respect to a credit card, it should be understood that other embodiments relating to other types of payment methods such as debit cards, gift cards, and any other such type of financial account, including online financial accounts, are contemplated as well.

According to some embodiments, transaction server 114 may determine the identity of a merchant associated with an attempted transaction based on the merchant category code included in the transaction authorization data and/or other transaction authorization data such as the zip code and country code. For example, in some embodiments, transaction server 114 may be configured to determine the identity of the business, such as a particular chain of fast food restaurants, based on the merchant category code. According to some embodiments, transaction server 114 may determine information about the merchant associated with a transaction such as the merchant's name, type/category of merchant, location, address and the like, by utilizing third party data and/or machine learning techniques to derive such information. According to some embodiments, transaction server 114 may be configured to determine one or more of a merchant description, a merchant name, a merchant location/address/zip code/country code based on a transaction ID associated with the transaction. In some embodiments, transaction server 114 may be configured to determine the location or address of the attempted purchase based on the merchant category code or other data provided with a transaction authorization request. According to some embodiments, if the identity of the merchant may not be determined solely based on the merchant category code, it may be determined based on the merchant category code in conjunction with the location information or other information derived from the transaction authorization request. In some embodiments, transaction server 114 may be configured to determine the type of business at which the attempted transaction is made based on the merchant category code, such as whether the merchant is a restaurant, gas station, book store, movie theater or the like. In some embodiments, transaction server 114 may cleanse the raw transaction data and output transaction data that is human readable. For example, transaction server 114 may receive transaction authorization data associated with a transaction that has a transaction ID of NCPI567 and may cleanse the transaction to output that the transaction took place at a restaurant called "Burger Joint" that is located at 123 Main Street.

According to some embodiments, transaction server 114 may be configured to send and/or initiate payments from a financial account in response to authorizing an attempted transaction associated with the account. For example, if transaction server 114 authorizes a particular transaction made using a specified financial account at a merchant, then transaction server 114 may generate an instruction to debit the specified financial account with the amount of the transaction and credit an account associated with the merchant with the same amount. In some embodiments, if transaction server 114 authorizes an attempted transaction associated with a tokenized PAN, then transaction server may initiate a payment from an account associated with the tokenized PAN to a merchant at which the payment was made.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In other embodiments, components of organization 108 may communicate via network 106 without using local network 116.

According to some embodiments, database 118 may be a database associated with organization 108 and/or its related entity that may store a variety of information relating to customers, transactions, customer information, and business operations. Database 118 may also serve as a back-up storage device and may contain data and information that is also stored on, for example, local databases associated with web server 110, location services server 112, transaction server 114, and/or receipt policy administration server 120. Database 118 may be accessed by other devices and may be used to store records of every interaction, communication, and/or transaction a particular customer has had with organization 108 and/or its related entity. In some example implementations, database 118 may be utilized as a digital receipt archive associated with one or more users of system 100. For example, database 118 may store data associated with current or past transactions conducted by users of system 100, such as data identifying a purchaser, purchased product names, product descriptions, timestamp, location data, online URLs of items purchased, return policy expiration date, taxes, tip amounts, store name, cashier name and receipt preferences associated with past transactions. In some embodiments, a user of system 100 may be able to indicate through the receipt preferences that the receipts for certain transactions should be digitally stored in a digital receipt archive (e.g., database 118) or sent locally to user device 102.

Receipt policy administration server 120 may include a computer system configured to facilitate the administration of one or more receipt policies for a user (e.g., of user device 102). According to some embodiments, receipt policy administration server 120 may analyze requested purchases to determine how they comport with a receipt policy.

For example, receipt policy administration server 120 may receive purchase data (e.g., requested payment information) from transaction server 114. Receipt policy administration server 120 may retrieve a user profile corresponding to the purchaser (e.g., from database 118), and compare the receipt policy to the purchase data and user profile to determine whether or not a receipt should be generated for the transaction. Responsive to determining that a receipt should be generated for the transaction, receipt policy administration server 120 may set a receipt flag associated with a transaction authorization or cancellation message to indicate that the merchant device (e.g., merchant POS terminal 127) should provide the user with a receipt. Responsive to determining that a receipt should not be generated for the transaction, receipt policy administration server 120 may set a receipt flag associated with a transaction authorization or cancellation message to indicate that the merchant device (e.g., merchant POS terminal 127) should not provide the user with a receipt. Receipt policy administration server 120 may then transmit data associated with the receipt flag through local network 116 to the transaction server 112 to be included with a transaction authorization or cancellation message to be send over network 106 to the merchant device (e.g., merchant POS terminal 127).

Merchant database terminal 126 may have one or more processors 162 and one or more merchant databases 164, which may be any suitable repository of merchant data. Merchant database terminal 126 may be located at the POS location, off-site at another merchant location, or at a third-party location. Information stored in merchant database terminal 126 may be accessed (e.g., retrieved, updated, and added to) via network 106 by one or more devices (e.g., service provider terminal 110) of system 100. In other embodiments, merchant POS terminal 127 may be configured to process online transactions on behalf of the associated merchant. Merchant database 164 may store information relating to products and services offered by merchants such as pricing, quantity, availability, discounts, reviews, and any other such generally available information that a consumer may utilize in making a purchasing decision. In some embodiments, merchant database 164 may also include location information associated with products and services that identifies the location(s) that a particular product or service is available for purchase. In some embodiments, the location information may include an identification of a particular store, terminal, or kiosk that the product or service may be purchased from.

Merchant POS terminal 127 may have one or more POS devices 172, 174, 176 that communicate with one or more devices (e.g., user device 102) of system 100 via network 106. In some embodiments, POS devices 172, 174, 176 may be devices that are configured to receive or obtain payment information from user device 102. For example, one or more POS devices 172 174, 176 may include a near-field communication interface, a Bluetooth communication interface, a WiFi communication interface, or any other such communication interface that may enable communication between merchant POS terminal 127 and user device 102. In some embodiments, one or more POS devices 172, 174, 176 may include a scanner for scanning images or data that convey payment information displayed by user device 102, an image capture device for capturing images displayed by user device 102, a card-reading device for obtaining payment information from a card (e.g., by reading a chip imbedded in the card or reading information from a magnetic strip), or a keypad for receiving a user input representative of payment information (e.g., a typed credit card number).

Although the preceding description describes various functions of the user device 102, merchant database terminal 126, merchant POS terminal 127, web server 110, location services server 112, transaction server 114, database 118, and receipt policy administration server 120, in some embodiments, some or all of these functions may be carried out by one or more computing devices. For example, some or all of the functions of the user device 102, merchant database terminal 126, merchant POS terminal 127, web server 110, location services server 112, transaction server 114, database 118, and receipt policy administration server 120 may be carried out by a single device.

Figure 2:
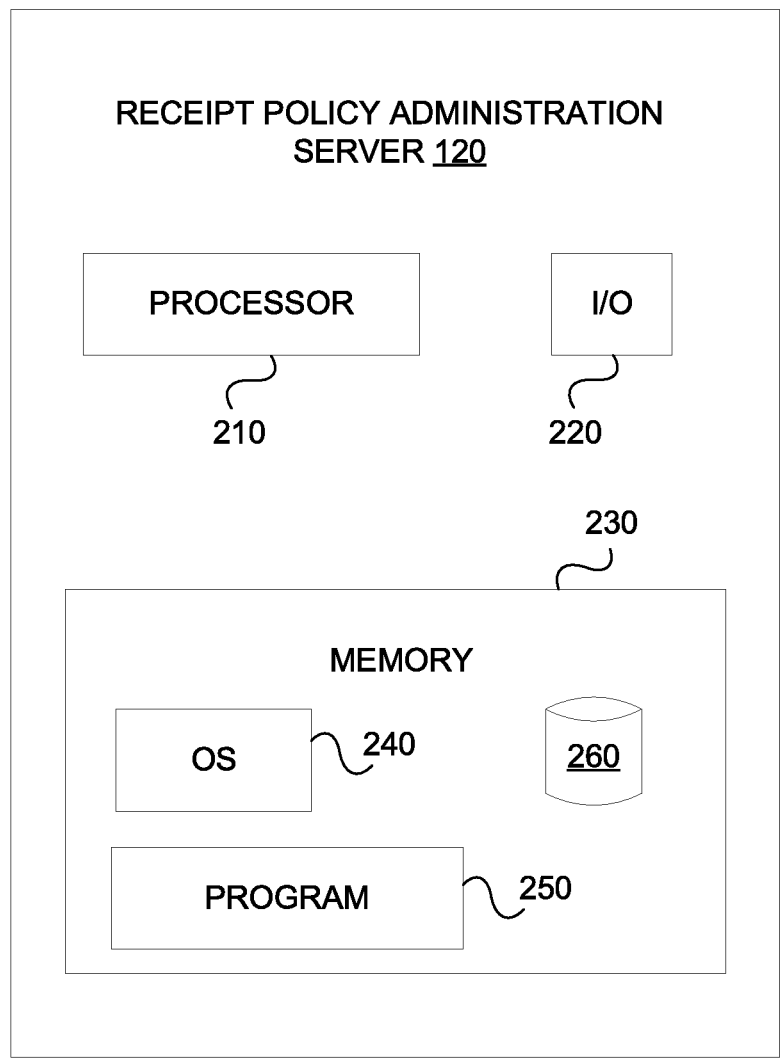
FIG. 2 is a component diagram of a receipting policy administration server according to an example embodiment.

An example embodiment of receipt policy administration server 120 is shown in more detail in FIG. 2. User device 102, web server 110, location services server 112, transaction server 114, merchant database terminal 126, and merchant POS terminal 127 may have a similar structure and components that are similar to those described with respect to purchasing policy administration server 120. As shown, receipt policy administration server 120 may include a processor 210, an input/output ("I/O") device 220, a memory 230 containing an operating system ("OS") 240, a program 250, and a database. For example, receipt policy administration server 120 may be a single server or may be configured as a distributed computer system including multiple servers or computers that interoperate to perform one or more of the processes and functionalities associated with the disclosed embodiments. In some embodiments, receipt policy administration server 120 may further include a peripheral interface, a transceiver, a mobile network interface in communication with processor 210, a bus configured to facilitate communication between the various components of the receipt policy administration server 120, and a power source configured to power one or more components of receipt policy administration server 120.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a USB port (e.g., standard, mini, micro, full duplex/Type C, etc.), a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), Wi-Fi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Receipt policy administration server 120 may include one or more storage devices configured to store information used by processor 210 (or other components) to perform certain functions related to the disclosed embodiments. In one example, receipt policy administration server 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, receipt policy administration server 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, receipt policy administration server 120 may include memory 230 that may include one or more programs 250 to perform one or more functions of the disclosed embodiments. Moreover, processor 210 may execute one or more programs 250 located remotely from receipt policy administration server 120. For example, receipt policy administration server 120 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include an image processing database 260 and a neural-network pipeline database 270 for storing related data to enable receipt policy administration server 120 to perform one or more of the processes and functionalities associated with the disclosed embodiments.

Receipt policy administration server 120 may also be communicatively connected to one or more memory devices (e.g., databases (not shown)) locally or through a network. The remote memory devices may be configured to store information and may be accessed and/or managed by receipt policy administration server 120. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Receipt policy administration server 120 may also include one or more I/O devices 220 that may include one or more interfaces for receiving signals or input from devices and providing signals or output to one or more devices that allow data to be received and/or transmitted by receipt policy administration server 120. For example, receipt policy administration server 120 may include interface components, which may provide interfaces to one or more input devices, such as one or more keyboards, mouse devices, touch screens, track pads, trackballs, scroll wheels, digital cameras, microphones, sensors, and the like, that enable receipt policy administration server 120 to receive data from one or more users (such as via user device 102).

In example embodiments of the disclosed technology, receipt policy administration server 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While receipt policy administration server 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the receipt policy administration server 120 may include a greater or lesser number of components than those illustrated.

Figure 3:
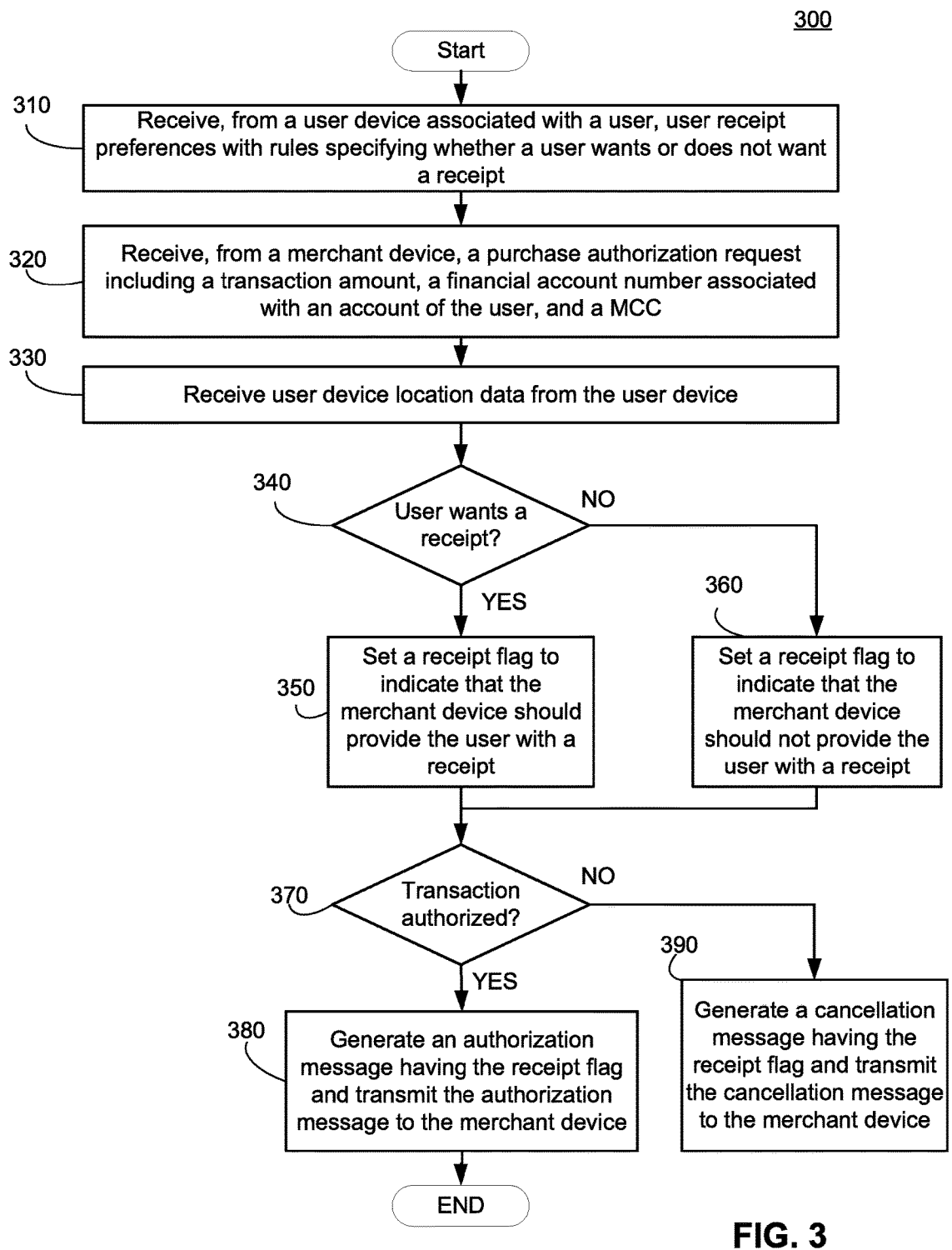
FIGS. 3-5 are flowcharts of one or more methods for implementing a user defined receipt policy in real-time according to certain example embodiments.

FIG. 3 shows a flowchart of a method 300 according to an example embodiment. Method 300 may be performed by, for example, one or more elements of system environment 100. As shown, method 300 may include receiving 310, from a user device associated with a user (e.g., user device 102), user receipt preferences comprising rules that specify whether a user wants or does not want a receipt. The rules specifying whether a user wants or does not want a receipt may be location, merchant, purchase amount, and/or recurring transaction specific. For example, user receipt preferences may comprise data indicating that the user only wishes to receive receipts when it is determined that the user device is at least a predetermined distance away from a specified location (e.g., when the user is traveling). Alternatively or additionally, the user receipt preferences may comprise data indicating that the user only wishes to receive receipts from certain types of merchants. Further, the user receipt preferences may comprise data indicating that the user only wishes to receive receipts for transactions over a predetermined amount. For users wanting to capture or omit recurring transactions, the user receipt preferences may comprise data indicating that the user only wishes to receive or not to receive receipts for transactions that occur in a predetermined time interval, which may be user-defined. For example, a user that eats lunch at the same restaurant every weekday may specify that they do not want receipts between 11 am and 1 pm on weekdays. As another example, a user that travels on a toll road in the mornings may specify that they do want receipts between 8 am and 9 am. In some example embodiments, the user receipt preferences further comprise rules that specify whether a user wants a printed receipt or an electronic receipt (e-receipt). For example, a user may specify that they want an e-receipt for all purchases under a given transaction amount (e.g., all purchases less than $50). The user receipt preferences may further comprise an e-receipt delivery location, such as, for example, an email address associated with the user. In some embodiment, the user receipt preferences may specify different locations for rules that specify multiple e-receipt delivery locations for a given account, with each location being associated with a certain type of transaction. For example, a user may wish to have receipts for personal transaction sent to one e-receipt delivery location while having receipts for business transactions sent to another e-receipt delivery location. In some implementations, a user may specify rules for what type of transaction constitutes a personal transaction versus a business transaction.

In certain implementations, the user receipt preferences may be received via a software application executed on user device 102. For example, the user may enter user preference rules into a graphical user interface (GUI) associated with a software application executed on user device 102. In some example embodiments, the user may enter user preference rules into a website running on user device 102. In some implementations, the system 108 may receive user receipt preferences over network 106 from user device 102. Receipt policy administration server 120 may determine a set of receipt rules based on the user receipt preferences. In some embodiments, the set of user receipt rules may correlate to a given user receipt preferences. For example, if a user does not wish to receive receipts for transactions under $50, the associated rule may dictate that if a transaction amount is less than $50, a receipt should not be printed. In some embodiments, the system 100 may monitor user transactions, and by applying machine learning to the user transaction data, may determine additional proposed rules. System 100 may then present the additional proposed rules to the user for approval. As will be appreciated, such an embodiment, allows to system to learn a user's preferences over time. Additionally, such an embodiment, provides the advantage of learning the user's preferences without the user having to manually input a large amount of user preferences.

Method 300 may further include receiving 320, from a merchant device (e.g., merchant POS terminal 127), a purchase authorization request associated with an attempted purchase comprising a transaction amount, a financial account number associated with an account of a user, and a MCC. In some cases, the transaction server 114 may receive the purchase authorization request from a merchant POS terminal 127. In some embodiments, the MCC may be used (e.g., by receipt policy administration server 120) to determine a type of merchant in order to determine if a user wishes to receive a receipt associated with the purchase. In some cases, the transaction server 114 may also receive (e.g., from merchant POS terminal 127) additional purchase data associated with the attempted purchase. The additional purchase data may include a list of one or more items or services and respective costs of each of the one or more items or services. According to some embodiments, the additional purchase data may include a time stamp of the purchase. In certain implementations, the additional purchase data may be received via a software application executed on user device 102 (e.g., in response to the software application being used in association with the attempted purchase) to provide the benefit of reducing the amount of data transmitted over the payment processing network reducing data traffic and improve the performance of the network. As will be appreciated, additional purchase data may include any data associated with a given user transaction, such as, for example, the location of the transaction, the time of the transaction, item information, merchant device id, cashier information, and any other relevant transaction data.

Method 300 may further include receiving 330, from the user device, user device location data. For example, in some embodiments, location services server 112 may receive location data through network 106 from user device 102. According to some embodiments, user device location data may include global positioning satellite (GPS) data received from user device 102. In some example embodiments, locations services server 112 may receive, from an application running on user device 102, GPS data comprising the coordinates of the user device. In some embodiments, user device location data may include wireless access point connection information associated with user device 102. According to some embodiments, the wireless access point connection information may include locations of one or more wireless access points. In some embodiments, user device location data may include visual information obtained from an image capture device associated with user device 102.

Method 300 may further include determining 340, based on the purchase authorization request, the user receipt preferences, and the user device location data, a receipt status. For example, in some embodiments, transaction server 114 may receive the purchase authorization request over network 106 from merchant POS terminal 127 and, in response, transmit the purchase authorization request over local network 116 to the receipt policy administration server. In some embodiments, web server 110 may receive user receipt preferences over network 106 from user device 102 and transmit the user receipt preferences over local network 116 to database 118. In some embodiments, web server 110 may receive user receipt preferences over network 106 from user device 102 and transmit the user receipt preferences over local network 116 to receipt policy administration server 120. According to some embodiments, location services server 112 may receive user device location data over network 106 from user device 102 and transmit user device location data over local network 116 to receipt policy administration server 120. Receipt policy administration server 120 may then compare purchase authorization request data and user device location data to the user receipt preferences in order to determine a receipt status.

In some embodiments, the receipt status may be determined based on a comparison of purchase authorization request data with a set of user rules. For example, a user may stipulate that they never want a receipt for transactions below $50. In such an example, the system may receive a transaction amount of $45, and may determine that the receipt status should indicate that the user should not receive a receipt for the transaction. As another example, a user may stipulate that they only want receipts from grocery stores. In such an example, the system may receive a MCC of 1234, and may determine that this MCC is associated with Cathy's Grocery Store. Based on the user's stipulation, the system may determine that the receipt status should indicate that a user should receive a receipt for the transaction. As yet another example, a user may stipulate that they only want receipts during certain times. A user could stipulate that they only want receipts during a business trip, for example, indicating that the trip begins on Monday and ends on Friday. The system may receive purchase authorization request including a time stamp indicating that the transaction occurred on Tuesday. Based on the time stamp and the user preferences, the system the system may determine that the receipt status should indicate that a user should receive a receipt for the transaction.

In some embodiments, the receipt status may be determined based on a comparison of purchase authorization request data and user data with a set of user rules. For example, a user may stipulate that they only want to receive receipts for transactions occurring when the user is on a trip. The system may receive a purchase authorization request from a merchant in addition to user location data from a user device. Based on the user location data, the system may determine that the user is more than a predetermined distance from their home. Accordingly, the system may determine that the receipt status should indicate that a user should receive a receipt for the transaction. According to some embodiments, the receipt status may further indicate the type of receipt that the user wishes to receive. For example, the receipt status may indicate that the user wishes to receive a printed copy of the receipt. The receipt status may also indicate that the user wishes to receive an electronic receipt. In such a case, the receipt status may also indicate a location to which the electronic receipt should be transmitted.

Responsive to determining that the receipt status indicates that the user wishes to receive a receipt, the method 300 may further include setting 350 a receipt flag to indicate that the merchant device should provide the user with a receipt. In some implementations, the system 108 may receive user receipt preferences over network 106 from user device 102. Receipt policy administration server 120 may determine a set of receipt rules based on the user receipt preferences. After a transaction is initiated, system 108 may receive transaction data over network 106 and may compare transaction data to the set of receipt rules in order to determine whether or not the user wishes to receive a receipt. In some embodiments, the receipt flag may be a single bit to be included in a datastream (e.g., transaction aurthorization message). In such an example, a receipt flag value of 1 may indicate that the merchant device should provide the user with a receipt, while a receipt flag value of zero (0) may indicate that the merchant device should not provide the user with a receipt.

Responsive to determining that the receipt status indicates that the user does not wish to receive a receipt, the method 300 may further include setting 360 a receipt flag to indicate that the merchant device should not provide the user with a receipt.

Method 300 may further include determining 370 whether or not the attempted purchase should be authorized. For example, the system may determine whether the available balance in the user's account is at least equate to the transaction amount associated with the attempted transaction.

Responsive to determining that the attempted purchase should be authorized, the method 300 may further include generating 380 an authorization message and transmit, to the merchant device, the authorization message comprising the receipt flag and data indicative that the merchant device is authorized to complete the purchase. In some embodiments, this determination may be made based on a comparison of the amount of money in the account associated with the purchase authorization request and the amount of money requested in the purchase authorization request. According to some embodiments, this determination may be made based additionally on security measures, such as, for example a determination that the location associated with the purchase authorization request data is within a predetermined distance from the location of the user device.

Responsive to determining that the attempted purchase should not be authorized, the method 300 may further include generating 390 a cancellation message and transmitting, to the merchant device, the cancellation message comprising the receipt flag and data indicative that the merchant device should cancel the attempted purchase. In some embodiments, this determination may be made based on a comparison of the amount of money in the account associated with the purchase authorization request and the amount of money requested in the purchase authorization request. According to some embodiments, this determination may be made based on additional security measures, such as, for example a determination that the location associated with the purchase authorization request data is within a predetermined distance from the location of the user device.

In some embodiments in which the user receipt preferences comprise rules that specify whether a user wants a printed receipt or an electronic receipt, responsive to determining that the receipt status indicates that the user wishes to receive an electronic receipt, the method 300 may further include setting a receipt flag to indicate that the merchant device should provide the user with an electronic receipt.

Figure 4:
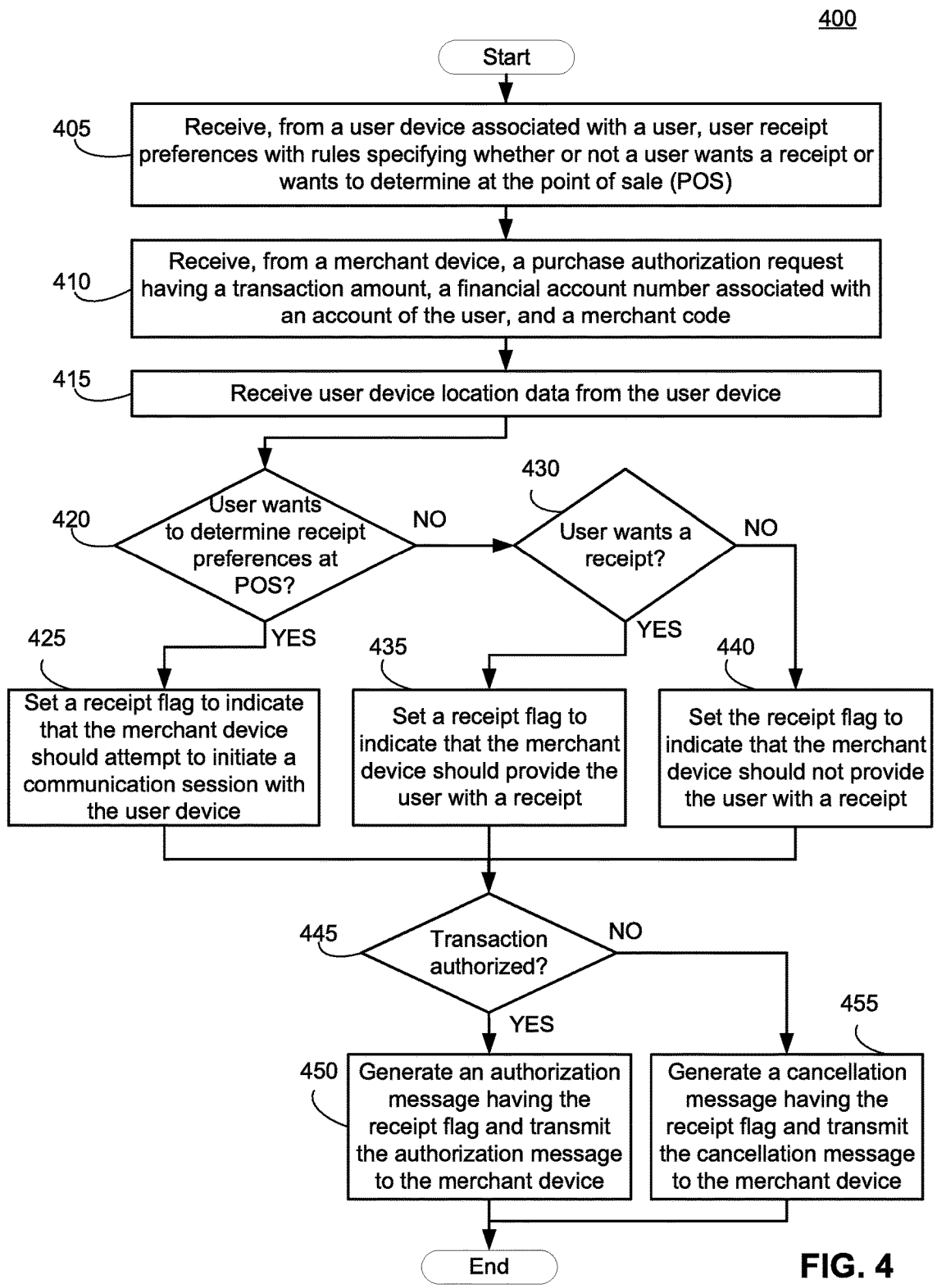

FIG. 4 shows a flowchart of a method 400 according to an example embodiment. Method 400 may be performed by, for example, one or more elements of system environment 100. Referring to FIG. 4, method 400 may include receiving 405, from a user device associated with a user, one or more user receipt preferences. The user receipt preferences may include rules that specify whether a user wants a receipt, does not want a receipt, or wants to determine at the point of sale. According to some example embodiments, user receipt preferences comprise data indicating that the user only wishes to receive receipts when it is determined that the user device is at least a predetermined distance away from a specified location. For example, in some embodiments, a user may only wish to receive receipts when they are traveling. In some embodiments, the user receipt preferences comprise data indicating that the user only wishes to receive receipts from certain types of merchants. According to some embodiments, the user receipt preferences comprise data indicating that the user only wishes to receive receipts for transactions over a predetermined amount. In some example embodiments, the user receipt preferences further comprise rules that specify whether a user wants a printed receipt or an electronic receipt. According to some embodiments, the user receipt preferences comprise data indicating that the user only wishes to receive receipts for transactions that occur in a predetermined time interval. According to some example embodiments, the user receipt preferences may comprise data indicating that the user wishes to determine whether or not to receive a receipt at the point of sale.

Method 400 may also include receiving 410, from a merchant device (e.g., merchant POS terminal 127), a purchase authorization request associated with an attempted purchase comprising a transaction amount, a financial account number associated with an account of a user, and a MCC. Receiving a purchase authorization request associated with an attempted purchase may be similar to that described above with reference to block 320.

Method 400 may also include receiving 415, from the user device, user device location data. Receiving user device location data may be similar to that described above with reference to block 330.

Method 400 may further include determining, based on the purchase authorization request, the user receipt preferences, and the user device location data, a receipt status. In some embodiments, as part of determining the receipt status, the system may determine whether the receipt status will be user-determined (e.g., determined based on user preferences or if the user wishes to determine, by user device at point of sale, the receipt status).

Responsive to determining that the receipt status indicates that the user wishes to determine whether or not they want a receipt at point of sale, the method 400 may further include setting 425 a receipt flag to indicate that the merchant device should attempt to initiate a communication session with a user device associated with the user.

Responsive to determining that the user does not wish to determine whether or not they want a receipt at point of sale, the method 400 may further include determining 430 whether or not the user wishes to receive a receipt for the attempted transaction. Determining whether or not the user wants a receipt may be similar to that described above with reference to block 340.

Responsive to determining that the receipt status indicates that the user wishes to receive a receipt, the method 400 may further include setting 435 a receipt flag to indicate that the merchant device should provide the user with a receipt. Setting a receipt flag to indicate that the merchant device should provide the user with a receipt may be similar to that described above with reference to block 350.

Responsive to determining that the receipt status indicates that the user does not wish to receive a receipt, the method 400 may further include setting 440 a receipt flag to indicate that the merchant device should not provide the user with a receipt. Setting a receipt flag to indicate that the merchant device should not provide the user with a receipt may be similar to that described above with reference to block 360.

Method 400 may further include determining 445 whether or not the attempted purchase should be authorized. Determining whether or not the attempted purchase should be authorized may be similar to that described above with reference to block 370.

Responsive to determining that the attempted purchase should be authorized, the method 400 may further include generating 450 an authorization message and transmit, to the merchant device, the authorization message comprising the receipt flag and data indicative that the merchant device is authorized to complete the purchase. Generating the authorization message and transmitting the authorization message to the merchant device may be similar to that described above with reference to block 380.

Responsive to determining that the attempted purchase should not be authorized, the method 400 may further include generating 455 a cancellation message and transmit, to the merchant device, the cancellation message comprising the receipt flag and data indicative that the merchant device should cancel the attempted purchase. Generating the cancellation message and transmitting the cancellation message to the merchant device may be similar to that described above with reference to block 390.

Figure 5:
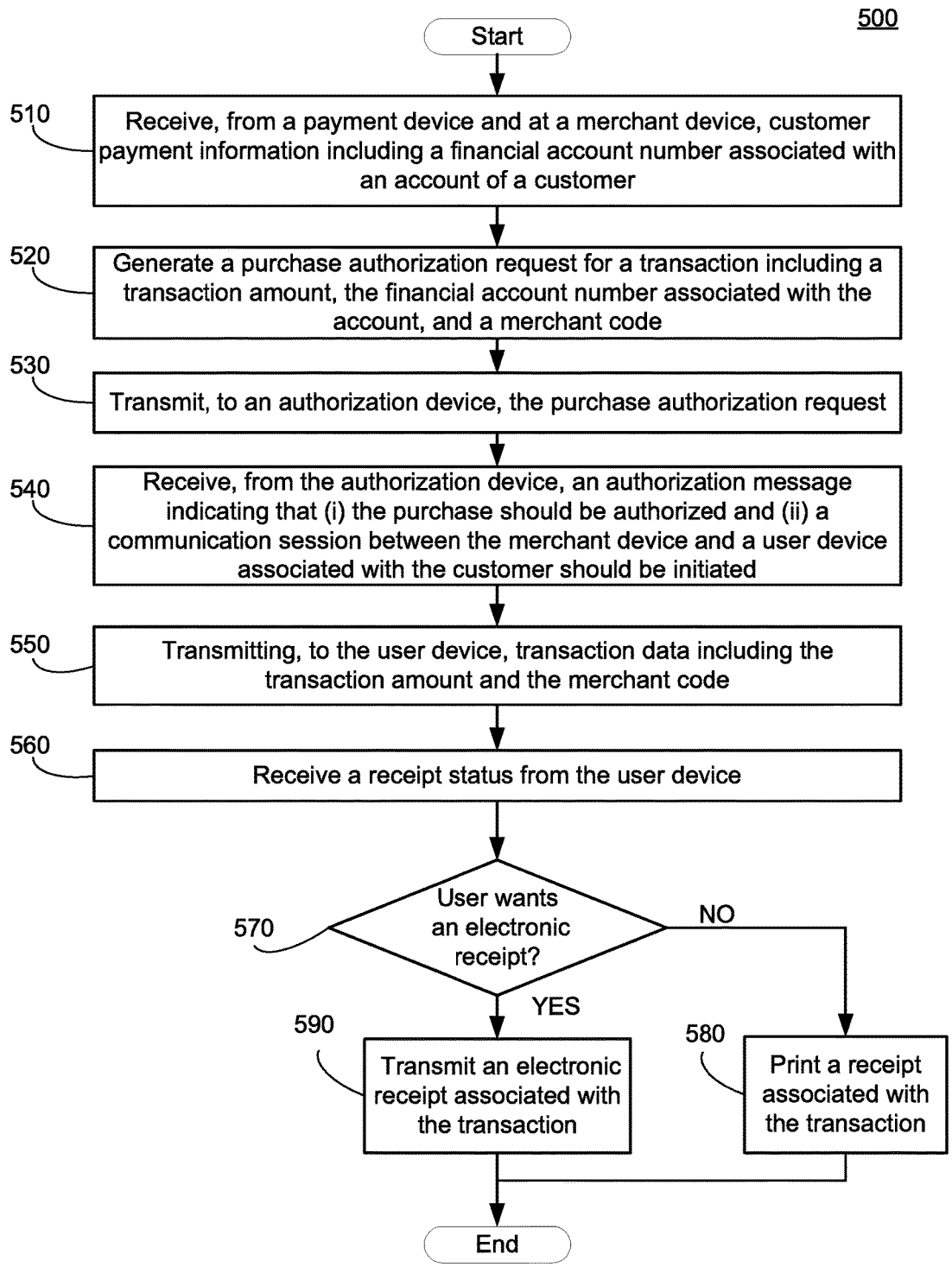

FIG. 5 shows a flowchart of a method 500 according to an example embodiment. Method 500 may be performed by, for example, one or more elements of system environment 100. Referring to FIG. 5, method 500 may include receiving 510, from a payment device and at a merchant device, customer payment information comprising a financial account number associated with an account of a customer. For example, in some embodiments, merchant POS terminal 127 may receive customer payment information over network 106 from user device 102. In some example embodiments, merchant POS terminal 127 may receive customer payment information directly from user device 102. In some embodiments a payment device may be a user device associated with a customer capable of transmitting customer payment information. For example, payment device may be a credit card, a debit card, a smart card, a cell phone, or other device similar to those previously described in relation to user device 102.

Method 500 may further include generating 520 a purchase authorization request for a transaction comprising a transaction amount, the financial account number associated with the account of the user, and a merchant code.

Method 500 may further include transmitting 530, to an authorization device, the purchase authorization request. In some embodiments, for example, merchant POS terminal 207 may transmit a purchase authorization request over network 106 to transaction server 114.

Method 500 may further include receiving 540, from the authorization device, an authorization message indicating that the purchase should be authorized and that a communication session between the merchant device and a user device associated with the customer should be initiated. For example, in some embodiments, merchant POS terminal 207 may receive, over network 106 and from transaction server 114, an authorization message.

Responsive to receiving the authorization message, the method 500 may further include transmitting 550, to the user device associated with the customer, transaction data comprising the transaction amount and a merchant code. For example, in some embodiments, merchant POS terminal 127 may transmit over network 106 to user device 102 the transaction data. In other embodiments, merchant POS terminal 127 may communicate with user device 102 via a direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. As will be appreciated, such an embodiment provides the benefit of reducing the amount of data transmitted over the payment processing network (e.g., network 106), thus reducing data traffic and improving the performance of the network. As will be appreciated, such an embodiment may provide the additional benefit of reducing the time required to process the transaction.

Method 500 may further include receiving 560, from the user device associated with the customer, a receipt status. For example, in some embodiments, merchant POS terminal 207 may receive over network 106 and from user device 102 the receipt status. In some embodiments, the receipt status indicates whether or not a user wishes to have a receipt printed for the transaction. According to some embodiments, the receipt status indicates the type of receipt a user wishes to have printed for the transaction. According to some example embodiments, the receipt status includes data indicating a location that the merchant device should send the electronic receipt. In some example embodiments, the user device associated with the user automatically determines, based on the transaction data and user preference data, the receipt status. According to some embodiments, the user device associated with the user prompts the user in order to determine the receipt status. In some embodiments, the user device associated with the customer and the payment device may be the same device (e.g., user device 102).

Method 500 may further include determining 570 whether or the user wishes to receive an electronic receipt. In some embodiments, the system may receive a receipt flag comprising a single bit to be included in a datastream (e.g., transaction aurthorization message). In such an example, a receipt flag value of one (1) may indicate that the merchant device should provide the user with an electronic receipt, while a receipt flag value of zero (0) may indicate that the merchant device should provide the user with a printed receipt. In some embodiments, the receipt flag may further include data indicating the location to which an electronic receipt should be transmitted.

Responsive to determining that the receipt status indicates that the user wishes to receive a printed receipt, the method 500 may further include printing 580 a receipt associated with the transaction.

Responsive to determining that the receipt status indicates that the user wishes to receive an electronic receipt, the method 500 may further include transmitting 590, to the user device associated with the customer, an electronic receipt associated with the transaction. For example, in some embodiments, merchant POS terminal 127 may generate an electronic receipt and may transmit the electronic receipt over network 106 to user device 102.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a cloud computing network of remote servers, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLE USE CASES

The following example use case describes an example of a use of systems and methods for performing real-time transaction processing using individualized user receipt policy. These example use cases are intended solely for explanatory purposes and not for limitation. In one case, a user defines a receipt policy comprising rules that specify whether a user wants a receipt or does not want a receipt associated with a transaction. For example, a user may input their preferences on a user device through a website or application associated with their financial institution of choice. The user may then initiate a purchase at a merchant using a credit card associated with their financial institution. Accordingly, the merchant (e.g., merchant POS terminal 127) transmits an authorization request to an issuing financial service provider (e.g. a financial service provider with which the user has or creates an account). The issuing financial service provider (e.g., organization 108) may then check the transaction data against the user defined receipt policy and, based on this comparison, determine the receipt status associated with the transaction (e.g., whether or not a receipt should be printed for the transaction). The issuing financial service provider may then generate an authorization message that includes a receipt status flag and transmit the authorization message to the merchant. Based on the receipt flag, the merchant POS terminal 127 should be able to determine whether or not a receipt should be printed for the user.

In another case, a user may define a receipt policy including rules that specify (i) whether a user wants or does not want a receipt associated with a transaction, (ii) types of receipts desire, and/or (iii) the desired method of delivery. As previously discussed, the user may input their preferences on a user device (e.g., user device 102) through a website or application associated with their financial service provider of choice. The user may then initiate a purchase at a merchant using a credit card associated with their financial service provider. Accordingly, the merchant (e.g., merchant POS terminal 127) transmits an authorization request to an issuing financial service provider (e.g. a financial service provider with which the user has to create an account). In this case, when the issuing financial service provider determines the receipt status, there will be more options than a simple receipt or no receipt indication. In this instance, the receipt status would indicate one of three options: (1) print a receipt, (2) do not print a receipt, or (3) initiate a communication session with a device (e.g., user device 102) associated with the user in order to determine the receipt status. The issuing financial service provider may then generate an authorization message that includes a receipt status flag and may transmit the authorization message to the merchant. In the case where the merchant (e.g., merchant POS terminal 127) should initiate a communication session with a device associated with the customer in order to determine the receipt status, a merchant device may communicate with an application running on a user's cell phone (e.g., user device 102) in order to determine the receipt status. For example, the merchant device (e.g., merchant POS terminal 127) may transmit the transaction information (e.g., amount, data, merchant code, etc.) to the user device (e.g., user device 102) and the user device may make the determination of the receipt status. In a case where the receipt policy dictate that only e-receipts should be issued for transactions of less than $100, the user device (e.g., user device 102) may determine that the transaction is for $90 and transmit to the merchant device (e.g., merchant POS terminal 127) a request for an e-receipt and a location to which it should be delivered.

What is claimed is:

1. A transaction processing system, the system comprising:
   one or more processors; and
   a memory in communication with the one or more processors and storing instructions that, when executed by the one or more processors, cause the system to:

receive, from a user device associated with a user, user receipt preferences comprising rules that specify whether the user wants a receipt, wants to decide at a point of sale, or does not want a receipt;

receive, from a merchant device, a purchase authorization request associated with an attempted purchase comprising a transaction amount, a financial account number associated with an account of the user, and a merchant category code (MCC);

receive, from the user device, location data;

determine, based on the user receipt preferences and the location data, a receipt status;

responsive to determining that the receipt status indicates that the user wishes to receive a receipt, set a receipt flag to indicate that the merchant device should provide the user with a receipt;

responsive to determining that the receipt status indicates that the user does not wish to receive a receipt, set the receipt flag to indicate that the merchant device should not provide the user with the receipt;

responsive to determining that the receipt status indicates that the user wishes to determine at the point of sale, set the receipt flag to indicate the merchant device should attempt to initiate a direct wireless communication session with the user device;

responsive to determining that the attempted purchase should be authorized, generate an authorization message and transmit, to the merchant device, the authorization message comprising the receipt flag and data indicative that the merchant device is authorized to complete the attempted purchase; and responsive to determining that the attempted purchase should not be authorized, generate a cancellation message and transmit, to the merchant device, the cancellation message comprising the receipt flag and data indicative that the merchant device should cancel the attempted purchase.

2. The system of claim 1, wherein the user receipt preferences comprise data indicating that the user only wishes to receive receipts when it is determined, based on the location data, that the user device is at least a predetermined distance away from a specified location.

3. The system of claim 1, wherein receiving the location data comprises:

receiving, from an application running on the user device, GPS data comprising the coordinates of the user device.

4. The system of claim 1, wherein the user receipt preferences comprise data indicating that the user only wishes to receive receipts from certain types of merchants and wherein the type of merchant is determined based on the MCC.

5. The system of claim 1, wherein the user receipt preferences comprise data indicating that the user only wishes to receive receipts for transactions over a predetermined amount.

6. The system of claim 1, wherein the user receipt preferences further comprise rules that specify whether a user wants a printed receipt or an electronic receipt.

7. The system of claim 6, further comprising instructions to cause the system to:

responsive to determining that the receipt status indicates that the user wishes to receive the electronic receipt, set the receipt flag to indicate that the merchant device should provide the user with the electronic receipt.

8. The system of claim 6, further comprising instructions to cause the system to:

receive, from the user device, a delivery location comprising a location for delivery of the electronic receipt.

9. The system of claim 1, wherein the purchase authorization request further comprises a time stamp and the user receipt preferences comprise data indicating that the user only wishes to receive receipts for transactions that occur in a predetermined time interval.

10. A method for enhanced transaction processing, the method comprising:

receiving, from a user device associated with a user, user receipt preferences comprising rules that specify whether a user wants a receipt, does not want a receipt, or wants to determine at a point of sale;

receiving, from a merchant device, a purchase authorization request associated with an attempted purchase comprising a merchant code;

receiving, from the user device, location data;

determining, based on the user receipt preferences and the location data, a receipt status;

responsive to determining that the receipt status indicates that the user wishes to receive a receipt, setting a receipt flag to indicate that the merchant device should provide the user with the receipt;

responsive to determining that the receipt status indicates that the user does not wish to receive a receipt, setting the receipt flag to indicate that the merchant device should not provide the user with the receipt;

responsive to determining that the receipt status indicates that the user wishes to determine at the point of sale, setting the receipt flag to indicate the merchant device should attempt to initiate a direct communication session with the user device;

responsive to determining that the attempted purchase should be authorized, generating an authorization message and transmit, to the merchant device, the authorization message comprising the receipt flag and data indicative that the merchant device is authorized to complete the attempted purchase; and responsive to determining that the attempted purchase should not be authorized, generating a cancellation message and transmit, to the merchant device, the cancellation message comprising the receipt flag and data indicative that the merchant device should cancel the attempted purchase.

11. The method of claim 10, wherein the user receipt preferences comprise data indicating that the user only wishes to receive receipts when it is determined, based on the location data, that the user device is at least a predetermined distance away from a specified location.

12. The method of claim 10, wherein the user receipt preferences comprise data indicating that the user only wishes to receive receipts from certain types of merchants.

13. The method of claim 12, wherein the type of merchant is determined based on the merchant code.

14. The method of claim 10, wherein the user receipt preferences comprise data indicating that the user only wishes to receive receipts for transactions over a predetermined amount.

15. The method of claim 10, wherein the purchase authorization request further comprises a time stamp and the user receipt preferences comprise data indicating that the user only wishes to receive receipts for transactions that occur in a predetermined time interval.

16. A transaction processing device, the device comprising:
   one or more processors; and
   a memory in communication with the one or more processors and storing instructions that, when executed by the one or more processors, cause the device to:
   receive, from a payment device, customer payment information;
   generate a purchase authorization request for a transaction comprising a transaction amount, a financial account number associated with an account of a user, and a merchant code;
   transmit, to an authorization device, the purchase authorization request;
   receive, from the authorization device, an authorization message indicating that the purchase should be authorized and that a near-field communication session between a merchant device and a user device associated with the user should be initiated;
   responsive to receiving the authorization message, transmitting, to the user device, transaction data comprising the transaction amount and the merchant code;
   receive, from the user device, a receipt status indicating that the user wishes to receive an electronic receipt; and
   transmit, to the user device via the near-field communication session, the electronic receipt associated with the transaction.

17. The device of claim 16, wherein the user device and the payment device are the same device.

18. The device of claim 16, wherein the receipt status includes data indicating a location that the merchant device should send the electronic receipt.

19. The device of 16, wherein the user device automatically determines, based on the transaction data and user preference data, the receipt status.

20. The device of claim 16, wherein the user device prompts the user to determine the receipt status.

* * * * *